United States Patent
Cronin et al.

(10) Patent No.: US 8,793,968 B2
(45) Date of Patent: Aug. 5, 2014

(54) METHODS OF MANUFACTURING A PLASTIC SPICE CONTAINER

(75) Inventors: Edward P. Cronin, Brodhead, WI (US); George Solowiejko, Rockford, IL (US)

(73) Assignee: J.L. Clark, Inc., Rockford, IL (US)

( * ) Notice: Subject to any disclaimer, the term of this patent is extended or adjusted under 35 U.S.C. 154(b) by 716 days.

(21) Appl. No.: 12/764,722

(22) Filed: Apr. 21, 2010

(65) Prior Publication Data

US 2010/0270301 A1 Oct. 28, 2010

Related U.S. Application Data

(60) Provisional application No. 61/171,584, filed on Apr. 22, 2009.

(51) Int. Cl.
*B65B 7/28* (2006.01)
*B65B 51/22* (2006.01)
*B65B 1/02* (2006.01)

(52) U.S. Cl.
CPC ............. *B65B 7/2878* (2013.01); *B65B 51/225* (2013.01); *B65B 1/02* (2013.01); *Y10S 53/02* (2013.01)
USPC .................... 53/452; 53/471; 53/478; 53/486; 53/DIG. 2; 156/69

(58) Field of Classification Search
CPC .... B65B 51/225; B65B 51/22; B65B 7/2878; B65B 7/28; B65B 7/26
USPC ........ 53/452, 471, 478, 486, 561, 281, 284.5, 53/329.2, DIG. 2; 156/69
IPC ..................... B65B 51/22, 7/28, 7/26
See application file for complete search history.

(56) References Cited

U.S. PATENT DOCUMENTS

| | | | |
|---|---|---|---|
| 779,339 A | 1/1905 | Wulff | |
| 844,640 A | 2/1907 | West | |
| 961,991 A | 6/1910 | Ullrich | |
| 2,006,588 A | 7/1935 | Ehret | |
| D122,315 S | 9/1940 | Heller | |
| D153,270 S | 4/1949 | Erb | |
| 2,634,563 A * | 4/1953 | Magill et al. .................... | 53/452 |
| 2,925,797 A * | 2/1960 | Diezel et al. .................... | 53/308 |
| 3,155,285 A | 11/1964 | Van Baarn | |
| D200,270 S | 2/1965 | Waterman | |
| D204,509 S | 4/1966 | Waterman | |
| 3,251,509 A | 5/1966 | Foster | |
| 3,255,928 A | 6/1966 | Foster | |

(Continued)

FOREIGN PATENT DOCUMENTS

JP 01-071561 U 5/1989

*Primary Examiner* — Stephen F Gerrity
(74) *Attorney, Agent, or Firm* — Reinhart Boerner Van Deuren P.C.

(57) ABSTRACT

A spice container and method of making same is provided. The spice container includes a plastic container body and a plastic lid ultrasonically welded to an open end of the container body. The method of making the spice container includes molding the container body from plastic as a one-piece construction. However, during molding, prior to cooling, the container body has a rectangular outer periphery proximate a closed end and an outer periphery at an opposite end having at least one side that bows radially outward. After molding and after cooling, the outer periphery proximate the opposite end has a generally rectangular shape as the bowed side cools and shrinks to a generally straight side.

6 Claims, 3 Drawing Sheets

(56) References Cited

U.S. PATENT DOCUMENTS

| | | | |
|---|---|---|---|
| 3,370,757 A | 2/1968 | Foster | |
| 3,469,732 A | 9/1969 | Foster | |
| 3,714,755 A * | 2/1973 | Phalin et al. | 53/486 |
| 3,805,993 A | 4/1974 | Enzie et al. | |
| 3,998,030 A * | 12/1976 | Straub | 53/471 |
| 4,024,976 A | 5/1977 | Acton | |
| 4,098,421 A * | 7/1978 | Foster | 215/321 |
| 4,177,932 A | 12/1979 | Cleevely | |
| D272,807 S | 2/1984 | Ruhl | |
| 4,437,593 A | 3/1984 | Bullock, III | |
| 4,463,869 A | 8/1984 | Lewis | |
| D278,115 S | 3/1985 | Leininger | |
| 4,592,480 A | 6/1986 | Hart et al. | |
| 4,610,371 A | 9/1986 | Karkiewicz | |
| 4,621,744 A | 11/1986 | Foster | |
| 4,658,980 A | 4/1987 | Lindstrom | |
| 4,660,735 A | 4/1987 | Peschardt et al. | |
| 4,669,630 A | 6/1987 | Kenyon, 2nd | |
| 4,682,706 A | 7/1987 | DeVore et al. | |
| 4,724,977 A | 2/1988 | Cleevely et al. | |
| 4,732,293 A | 3/1988 | Landis | |
| 4,759,465 A | 7/1988 | Landis | |
| 4,816,093 A * | 3/1989 | Robbins, III | 53/452 |
| D312,190 S | 11/1990 | Ciaccio | |
| 5,046,632 A | 9/1991 | Bordner | |
| 5,052,572 A | 10/1991 | Pherigo | |
| 5,219,087 A | 6/1993 | Christensson | |
| 5,273,176 A | 12/1993 | Diaz | |
| 5,482,172 A | 1/1996 | Braddock | |
| 5,588,283 A * | 12/1996 | Martin | 53/486 |
| 5,617,968 A | 4/1997 | Luburic | |
| 5,626,251 A | 5/1997 | Luburic et al. | |
| D398,524 S | 9/1998 | Waterhouse | |
| 5,934,495 A | 8/1999 | Chiodo | |
| D448,295 S | 9/2001 | Mozes | |
| 6,422,411 B1 | 7/2002 | Gray | |
| D464,567 S | 10/2002 | Baerenwald et al. | |
| 6,522,411 B1 | 2/2003 | Moon et al. | |
| 6,802,920 B2 * | 10/2004 | Shinohara et al. | 53/DIG. 2 |
| 7,021,482 B2 | 4/2006 | Solowiejko | |
| 7,114,627 B2 | 10/2006 | Solowiejko | |
| 7,150,380 B2 | 12/2006 | Hoepner et al. | |
| 7,568,590 B1 * | 8/2009 | Gross et al. | 220/254.1 |
| 2005/0040168 A1 | 2/2005 | Solowiejko | |
| 2007/0056972 A1 | 3/2007 | Solowiejko | |
| 2007/0278254 A1 | 12/2007 | Wisniewski | |
| 2009/0101645 A1* | 4/2009 | Wilson et al. | 53/478 |
| 2009/0101647 A1* | 4/2009 | Newberry et al. | 220/266 |

* cited by examiner

METHODS OF MANUFACTURING A PLASTIC SPICE CONTAINER

CROSS-REFERENCE TO RELATED PATENT APPLICATIONS

This patent application claims the benefit of U.S. Provisional Patent Application No. 61/171,584, filed Apr. 22, 2009, the disclosure and teachings of which are incorporated herein, in their entireties, by reference.

FIELD OF THE INVENTION

This invention generally relates to containers and more particularly to plastic spice containers.

BACKGROUND OF THE INVENTION

Containers are used for a plethora of goods, including organic or perishable items such as food or spices. The conventional lid for a spice container contains an array of small holes for dispensing the small sized contents, typically in the form of powders or small particles, while one or more doors are operable to cover and reveal the array of dispensing holes. It is desirable to have a tamper evidence feature in the container lid so as to determine whether or not the lid has been opened. This is particularly important with food items to make sure that the food item has not been tampered with prior to purchase by a consumer such as at a grocery store or other retail establishment. Therefore, many spice containers have moved towards plastic lids for use on spice containers such that a plastic tamper evident strip can be included with the lid. The tamper evident strip must be removed for the lid to be opened for someone to tamper with the products stored therein. Thus, removal of the tamper evident strip would indicate tampering.

Unfortunately, when the plastic lid is merely snap-attached to a metal container body, it is still possible for the lid itself to be entirely removed from the metal body. Typically, the metal body includes structure that should keep the plastic lid and tamper evident strip secured to the metal body. However, significant force can be applied to the plastic lid to remove it from the metal body. Thus, the product stored therein can be tampered with and then the plastic lid resecured to the metal body while the tamper evident strip may be unaltered giving an appearance of the lack of tampering thereto.

Numerous spice container closures and/or containers are known as exemplified by U.S. Pat. Nos. 7,114,627; 7,021,482; 6,422,411; 5,052,572; 4,621,744; 3,370,757; 3,255,928; and 3,251,509; and U.S. Patent Publication No. 2007/0056972A1; all of which are assigned to the present assignee and all of which are hereby incorporated by reference in their entireties. The applicant has developed improvements to such closures and containers to which the present disclosure is directed.

BRIEF SUMMARY OF THE INVENTION

The present invention relates to a new and improved plastic container, and more particularly a new and improved plastic container including a container body and a container lid that are bonded to one another. In a preferred implementation of the invention, the container body and container lid are ultrasonically welded to one another. This provides the benefit of vibrating any potential particulates of the product stored within the plastic container from between the two components to provide an improved attachment therebetween.

Therefore, in one particular implementation, the present invention provides a plastic container having a container body that has a bottom and an annular sidewall extending from the bottom. The annular sidewall has an open end being opposite the bottom. Further, the container includes a container lid attached to the container body. The container lid is ultrasonically welded to the container body.

In other embodiments, the container body is merely permanently attached to the container lid such that removal of the lid requires damage of one or both of the two components.

In one embodiment, the annular sidewall provides an undercut region and the container lid has a cooperating radially outward extending structure In a particular embodiment, The undercut is provided by a radially inward extending portion of the annular sidewall. Further, the cooperating radially inward extending portion and the radially outward extending structure axially secures the container lid to the container body prior to ultrasonic welding the container lid to the container body. In a further embodiment, the annular sidewall is received in an annular channel of the container lid and the radially inward extending portion is formed by a distal end portion of the annular sidewall.

In one embodiment, there is a generally smooth transition between an outer surface of the annular sidewall and an outer surface of the container lid. A small seam or gap may be provided but the outer dimensions of the container lid and the container body are substantially identical to provide the smooth transition, and such a gap or seam will be considered to still provide a smooth transition. In one embodiment, the outer surface of the container lid is provided by an outer surface of an annular skirt that axially abuts a stepped portion of the annular sidewall. The stepped portion providing, in one embodiment, the undercut that axially secures the container lid to the container bottom.

In one embodiment, the annular sidewall has a generally rectangular cross-section having four sides, opposite sides being generally parallel to one another such that four sides are substantially, individually, planar and free of warping.

A further feature of an implementation of the present invention is a method of forming a spice container. More particularly, the new and improved method of forming the spice container results in a spice container having an outer rectangular periphery where opposed sides remain parallel to one another. The method further focuses on preventing the sides to bow radially inward after the container body has been formed. Therefore, in one particular implementation, the present invention provides a method of forming a spice container having a container lid attached to the container body. The container body has a bottom and an annular sidewall extending from the bottom. The annular sidewall has a generally rectangular outer periphery defined by outer surfaces of a pair of parallel sides comprising the following steps. The method includes molding the container body from a plastic material including forming the bottom and the annular sidewall into a one-piece construction. During this step of molding, the annular sidewall has a substantially rectangular outer periphery proximate the bottom. Further, at an opposite end of the annular sidewall, at least one of the sides is bowed. Further, after the step of molding, the container body has a generally rectangular outer periphery proximate the end proximate the bottom as well as the opposite end of the annular sidewall.

A further method includes forming a spice container comprising the steps of: providing a plastic spice container body; providing a plastic spice container lid and placing the plastic spice container lid on the plastic spice container body; ultrasonically welding the plastic spice container body to the plastic spice container lid.

In one implementation of the method, the plastic spice container body is filled with a powder product prior to the step of ultrasonically welding the plastic spice container lid to the plastic spice container body. In some implementations, the step of ultrasonically welding the plastic spice container lid to the plastic spice container body includes vibrating particulates of the powder product from between an interface between the plastic spice container lid and the plastic spice container body where the ultrasonic weld is formed.

In a further embodiment, the plastic spice container body has a bottom and an annular sidewall extending from the bottom, the annular sidewall has a generally rectangular outer periphery defined by outer surfaces of a pair of parallel sides; further comprising the step of molding the container body from a plastic material including forming the bottom and the annular sidewall into a one-piece construction, during molding the annular sidewall defines a substantially rectangular outer periphery proximate the bottom and at least one side that is bowed outward proximate an end opposite the bottom; and wherein after the plastic spice container body has been attached to the plastic spice container lid, the end opposite the bottom has a generally rectangular outer periphery such that the bowed side is substantially straight. In one method, the bowed at least one side is bowed at an angle of between about 1 and 5 degrees during the molding process.

Further, the step of placing the plastic spice container lid on the plastic spice container body may include axially securing the plastic spice container lid to the plastic spice container body by an axial interference between the plastic spice container lid and the plastic spice container body. The axial interference may be provided by a undercut provided by an annular sidewall of the container body and a radially outward projecting portion of the plastic spice container lid extending into the undercut. Further, the undercut may be provided by a radially inward projecting portion of the annular sidewall of the plastic spice container body.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
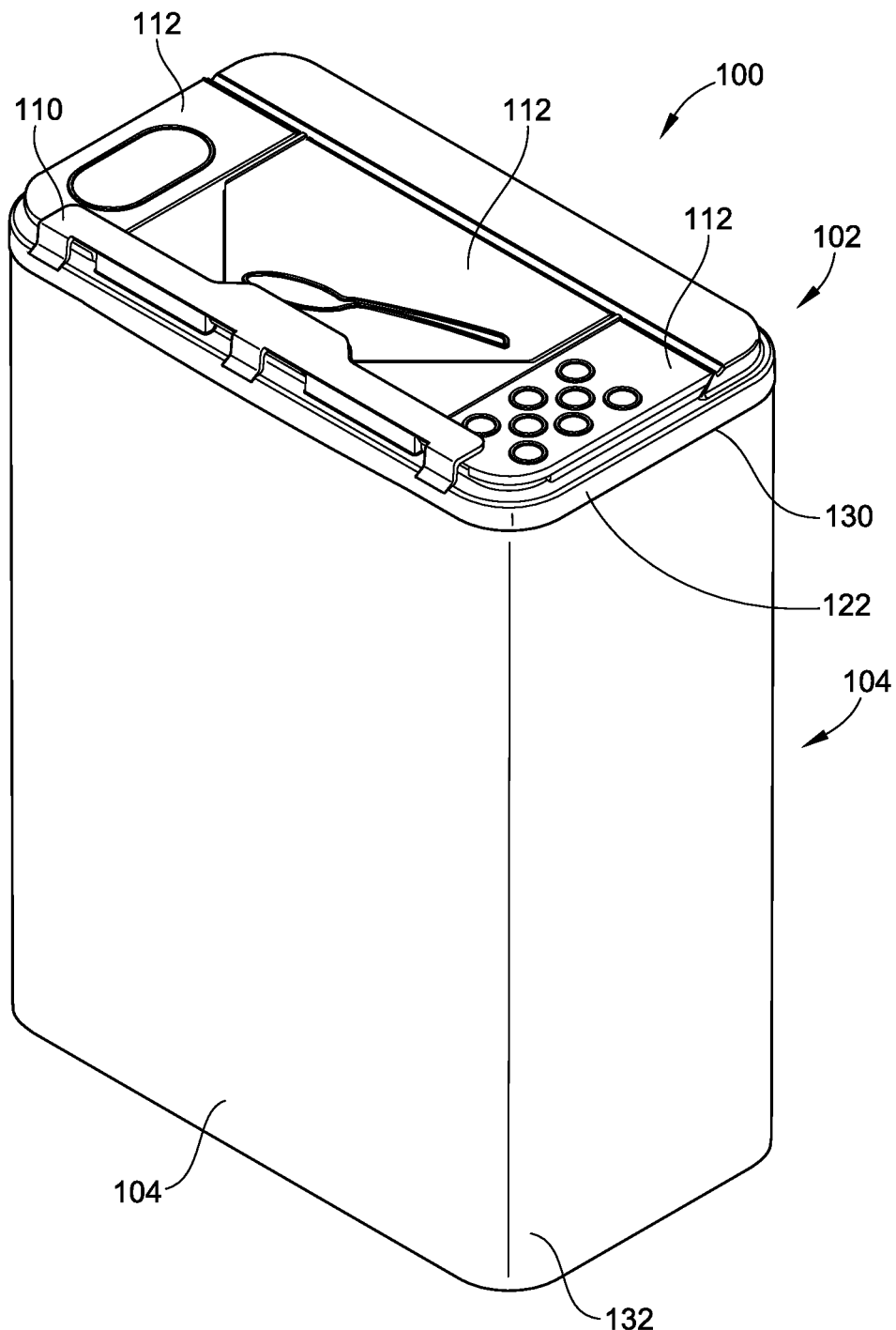
FIG. 1 is a top prospective illustration of a container according to the teachings of the present invention.

FIG. 1 illustrates a spice container 100 in accordance with the teachings of one embodiment of the present invention. The spice container 100 generally includes a lid 102 and a container body 104. The lid 102 is operably attached to the container body 104. The lid 102 and container body 104 combine to form an enclosed cavity 106 (see FIG. 2). This cavity 106 can be used for storing products. In one particular embodiment, the products that are to be stored in the cavity 106 are spices or other powder or granular food products.

When assembling the container 100, the manufacturer will first fill container body 104 with the products and then attach the lid 102. This method allows for rapid mass production of the container 100 and included products.

In one embodiment of the present invention, the lid 102 is a tamper evident lid 102. The lid 102 includes a tamper evidence strip 110 that indicates whether or not the individual closures 112 of the lid have been open. More particularly, the tamper evidence strip 110 has to be been broken for the container 100 to be tampered with through closures 112.

The present invention also provides further tamper evidence that is not found in previous spice container arrangements. More particularly, previous container arrangements that utilized a plastic lid attached to a container bodies could have been tampered potentially by removal of the entire lid from the container body. This is because the plastic lid was generally snap connected to the container body with an interference engagement therebetween. Thus, there would be no evidence of actual removal of the entire lid from the container body.

The additional tamper evidence feature is provided by the fact that in a preferred embodiment, the entire plastic lid 102 is welded to the container body 104 that is similarly made of a plastic material. The welding may be effectuated by means such as ultrasonic welding or heat welding. Ultrasonic welding of the two components has a significant benefit over other means. More particularly, due to the vibration that is required to cause friction to heat the two components to cause the welding, the vibration will additionally cause product particulates that are entrapped between the two products to potentially vibrate therefrom. This provides a stronger and more consistent weld between the two components as well as a better seal.

Figure 2:
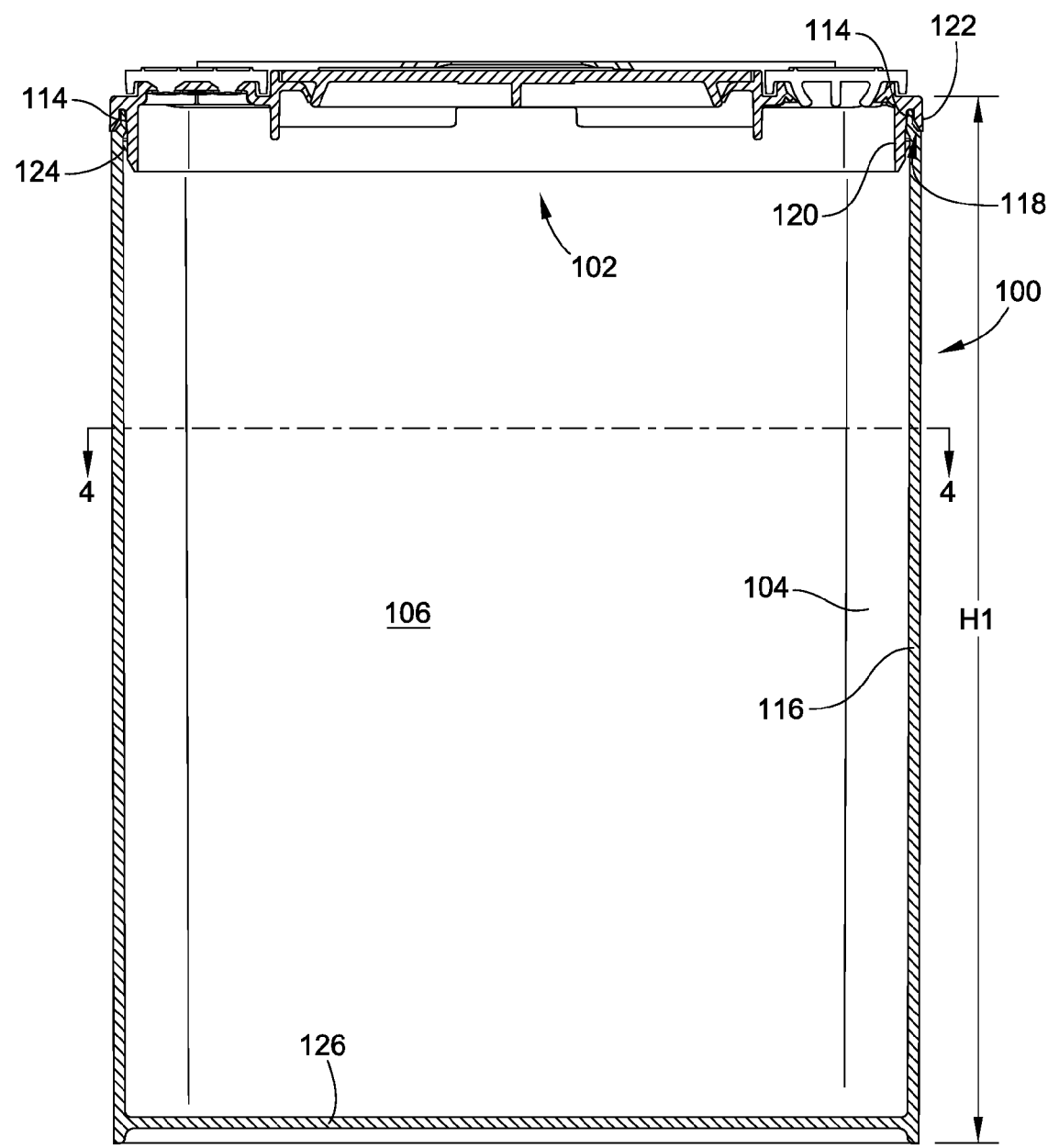
FIG. 2 is a cross-sectional illustration of the container of FIG. 1.
Figure 3:
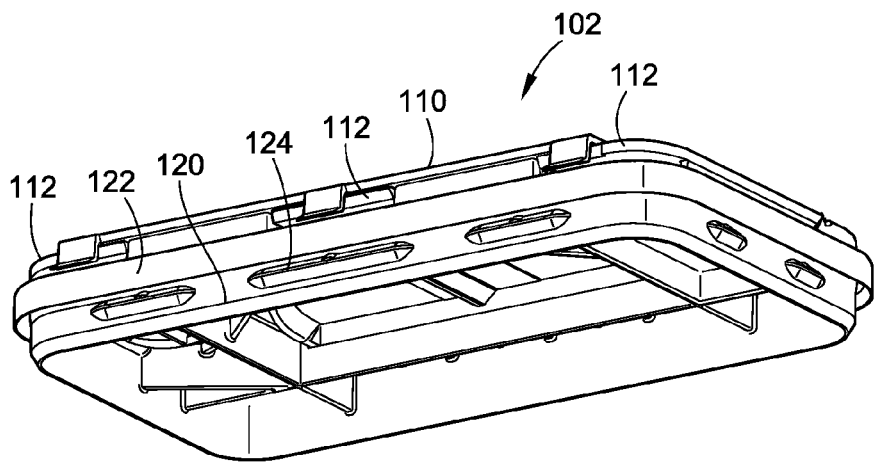
FIG. 3 is a bottom prospective illustration of the lid of the container of FIG. 1.

FIG. 2 is a cross-sectional illustration of the container 100 prior to welding the container lid 102 to the container body 104. As is illustrated, a distal open end 114 of the annular sidewall 116 of the container body 104 is axially received within the groove 118 formed by the container lid 102. The groove or channel 118 is formed between a pair of axially depending sidewalls (which may also referred to as skirts) of the container lid 102. The axially depending sidewalls 120, 122 are radially spaced from one another.

The inner sidewall 120 includes a radially extending projection 124 that engages a radially inward projection portion of distal end 114. However, this radially inward projection portion could be generally considered part of the container body. The radially inward projecting portion of distal end 114 forms an undercut or abutment portion that axially engages the radially extending projection 124. This axial engagement therebetween provides for securement of the container lid 102 to the container body 104 prior to ultrasonically welding the two portions together. Again, as noted previously, if any particulate of the product stored within cavity 106 gets lodged between the distal end 114 and either of sidewalls 120, 122, the ultrasonic welding will assist to vibrate the particulate out from therebetween so as to prevent or reduce the number of any inclusions within the weld.

This provides a further significant benefit over other connection means such as adhesives. Further, due to the fact that the product stored within the container 106 is typically a food stuff such as a spice or other powder or granulated food product, the use of the ultrasonic welding prevents any potential contamination of the product stored within the cavity 106, such as may occur when using an adhesive-type securement which could drip into the stored product.

The welding of the container lid 102 to the container body 104 also prevents the lid 102 from being removed from the container body 104 providing an additional level of tamper evidence and/or prevention. To tamper with the product within cavity 106, a potential tamperer must actually destroy the lid 102 or container body 104 which would provide evidence of tampering of the container 100.

While the preferred embodiment utilizes ultrasonic welding, other less desirous embodiments could utilize other means to secure the plastic lid 102 to the container body 104. For example, the lid 102 could be adhesively or chemically bonded to the container body 104. However, this provides a significantly less desirous arrangement as discussed previously. Further, other welds could be used, however, they would typically not have the vibrational benefits.

The container body 104 is generally formed of a plastic material. The container body includes a bottom 126 that is axially disposed from the container lid 102. The annular sidewall 116 of the container body 104 extends axially from bottom 126. In a preferred embodiment, the container body 104 is a one-piece construction. As such, the container body is entirely formed as a single piece and is not an assembly of pieces that are separately formed and then attached together such as by welding or adhesives or additional attachment arrangements.

One feature of the present invention is that the outer surface of sidewall 116 of the container body 104 is flush with and transitions into the outer surface of sidewall 122 of the container lid. While a seam 130 may be formed therebetween (see FIG. 1), the transition will provide a generally smooth substantially continuous surface.

Figure 4:
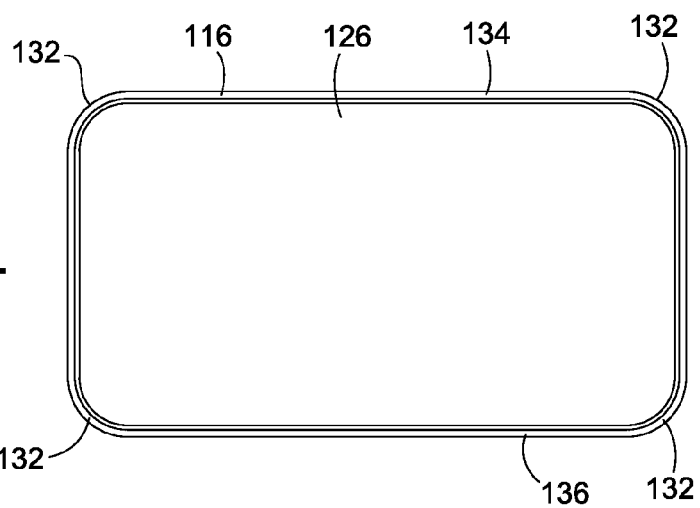
FIG. 4 is a cross-sectional illustration of the container body of FIG. 1 taken about line 4-4 of FIG. 2 illustrating the container body after manufacture.

When assembled, the container 100 generally has a rectangular outer periphery. More particularly, the annular sidewall 116 of the container body has four sides with opposed sides being generally parallel to one another. Adjacent sides are connected by a radiused corner 132 (see FIG. 4).

While it is desirous to have this generally rectangular outer periphery when finished, due to manufacturing processes, the Applicant has determined that the container body during manufacturing should not be initially formed with the same peripheral shape that is desired for the end configuration of the container 100. More particularly, with reference to FIG. 4, the longer sidewalls 134, 136 are substantially parallel and straight when the container is completed according to the present invention. However, in prior containers, the longer parallel sides would bow radially inward towards one another and not be parallel due to manufacturing processes. This bowing was caused due to cooling and shrinkage after the molding of the container body. The cooling would cause the parallel longer sidewalls to bend radially inward.

Figure 5:
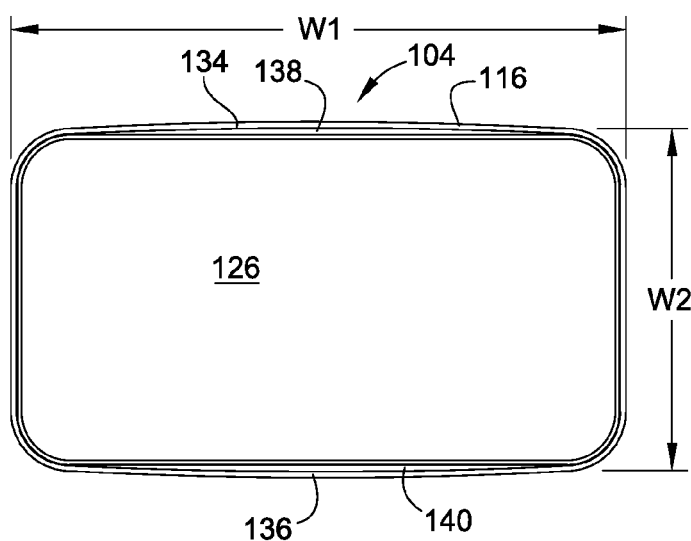
FIG. 5 is a cross-sectional illustration of the container body as it is being molded, illustrating the two outwardly bowed sidewalls.

Therefore, the Applicant has determined a method of forming a container body that avoids the problems of the prior art having the warped or bowed sidewalls. The Applicants have determined that they can mold the container body with a radially outward bowed contour. This contour is illustrated in FIG. 5. FIG. 5 is a cross section of the container body 104 during molding that illustrates that sides 134, 136 are radially bowed outward. This is further illustrated by the fact that the inner surfaces 138, 140 of sides 134, 136, respectively, can be seen in FIG. 5. This bowing of sides 134, 136 during manufacture allows for the sides 134, 136 to bow radially inward during the cooling process to a substantially parallel arrangement. Further, when the lid 102 is added to the container body 104, the lid 102 assists in maintaining the rectangular peripheral shape of the container body 104.

The long sides 134, 136 have width w1 of between about 1.5 inches and 4 inches. While the width w2 of the shorter sides is between about ½ inch and 2 inches. More preferably, the width w1 of side 134, 136 is between about 2.5 inches and 3.5 inches while the width w2 of the shorter sides is between about 1.25 and 2 inches. The height h1 (see FIG. 2) of the container body is preferably between about 2 inches and 4.5 inches. More preferably, the height h1 is between about 3 inches and 4 inches.

The long sides 134, 136 preferably are bowed outward and angled between about one degree and five degrees. This angle is measured from a perfectly parallel side. Further, the angle is measured between a point that is located at the midway point along the width w1 of the longer sides 134, 136. However other amounts of bowing in the initial design of the molded container body 104 may be used to properly accommodate for any shrinkage that may occur during the cooling process of the molded container body 104. Further, this bowing may be incorporated into the other sides that extend perpendicularly to longer sides 134, 136.

It is therefore a method according to the invention for manufacturing a container having a generally rectangular outer periphery by molding one or more of the sides forming the rectangular periphery with a bow therein such that upon cooling and/or shrinkage of the molded part, the opposed sides defining the rectangular periphery are generally parallel to one another. This molding with the bowed contour can be referred to as compensating for shrinkage during the molding process. Further, it should be noted that due to the inclusion of bottom 126 between and connecting the various sides of the container body 104, the bottom portion of the outer periphery will not be formed with the bowed or compensated profile. Therefore, the shape or outer periphery of the container body 104 when viewed in cross-section proximate the bottom 126 will be generally rectangular. However, the cross-section proximate the open end 114 will have the bowed contour illustrated in FIG. 5. Therefore, the method further includes molding the container body to have a non-constant cross-section from the closed end to the open distal end 114. The contour will transition from a generally rectangular cross-section to the more ovaled or bowed cross-section of FIG. 5.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a spice container having a container lid attached to a container body, the container body having a bottom and an annular sidewall extending from the bottom, the annular sidewall having a generally rectangular outer periphery defined by outer surfaces of a pair of parallel sides, the container lid has a annular outer sidewall having a generally rectangular outer periphery, the method comprising the step(s) of:

molding the container body from a plastic material including forming the bottom and the annular sidewall into a one-piece construction, during molding the annular sidewall defines a substantially rectangular outer periphery proximate the bottom and at least one side that is bowed outward proximate an end opposite the bottom;

wherein after the container body has been attached to the container lid, the end opposite the bottom has a generally rectangular outer periphery such that the bowed side is substantially straight; and attaching the container lid to the container body such that a seam is formed between an outer surface of the annular sidewall of the container body and an outer surface of the annular sidewall of the container lid, the outer surface of the annular sidewall of the container body being flush with and having a same outer peripheral shape and dimension as the outer surface of the annular sidewall of the container lid at the seam such that the outer surface of the annular sidewall of the container lid aligns with the outer surface of the annular sidewall of the container body thereby, providing a generally smooth and straight transition between the container lid and the container body;

wherein the outer surface of the annular sidewall of the container body extends between a first end and a second end and the outer surface of the annular sidewall of the container lid extends between a first end and a second end;

the step of attaching the plastic spice container lid on the plastic spice container body positions the first end of the outer surface of the annular sidewall of the container body adjacent the second end of the outer surface of the annular sidewall of the container lid forming the seam between the first end of the outer surface of the annular sidewall of the container body and the second end of the outer surface of the annular sidewall of the container lid; and when the container lid is on the container body, the outer periphery of the spice container is substantially constant and smooth from the first end of the container lid to second end of the container body.

2. A method of forming a spice container comprising the steps of:

providing a plastic spice container body having an annular sidewall having an outer surface that defines a generally rectangular outer periphery for the plastic spice container body;

providing a plastic spice container lid having an annular sidewall having an outer surface that defines a generally rectangular outer periphery for the plastic spice container lid;

placing the plastic spice container lid on the plastic spice container body such that a seam is formed between the outer surface of the annular sidewall of the plastic spice container body and the outer surface of the annular sidewall of the plastic spice container lid, the outer surface of the annular sidewall of the plastic spice container body being flush with the outer surface of the annular sidewall of the plastic spice container lid at the seam such that the outer surface of the annular sidewall of the container lid aligns with the outer surface of the annular sidewall of the container body thereby providing a generally smooth transition between the outer surface of the container lid and the outer surface of the container body;

ultrasonically welding the plastic spice container body to the plastic spice container lid;

wherein the outer surface of the annular sidewall of the container body extends between a first end and a second end and the outer surface of the annular sidewall of the container lid extends between a first end and a second end;

wherein the step of placing the container lid to the container body such that a seam is formed positions the first end of the outer surface of the annular sidewall of the container body adjacent the second end of the outer surface of the annular sidewall of the container lid forming the seam between the first end of the outer surface of the annular sidewall of the container body and the second end of the outer surface of the annular sidewall of the container lid;

wherein when the container lid is on the container body, the outer periphery of the spice container is substantially constant and smooth from the first end of the container lid to second end of the container body;

wherein the plastic spice container body has a bottom and an annular sidewall extending from the bottom, the annular sidewall has a generally rectangular outer periphery defined by a pair of parallel sides;

molding the container body from a plastic material including forming the bottom and the annular sidewall into a one-piece construction, during molding the annular sidewall defines a substantially rectangular outer periphery proximate the bottom and at least one side that is bowed outward proximate an end opposite the bottom; and wherein after the plastic spice container body has been attached to the plastic spice container lid, the end opposite the bottom has a generally rectangular outer periphery such that the bowed side is substantially straight.

3. The method of claim 2 further comprising the step of filling the plastic spice container body with a powder product prior to the step of ultrasonically welding the plastic spice container lid to the plastic spice container body.

4. The method of claim 3, wherein the step of ultrasonically welding the plastic spice container lid to the plastic spice container body includes vibrating particulates of the powder product from between an interface between the plastic spice container lid and the plastic spice container body where the ultrasonic weld is formed.

5. The method of claim 2, wherein the bowed at least one side is bowed at an angle of between about 1 and 5 degrees during the molding process.

6. The method of claim 2, wherein the step of placing the plastic spice container lid on the plastic spice container body includes axially securing the plastic spice container lid to the plastic spice container body by an axial interference between the plastic spice container lid and the plastic spice container body.

\* \* \* \* \*